United States Patent [19]
Kasai

[11] Patent Number: 5,104,238
[45] Date of Patent: Apr. 14, 1992

[54] IMPACT RESISTIVE LINEAR GUIDE APPARATUS

[75] Inventor: Shinichi Kasai, Gumma, Japan

[73] Assignee: Nippon Seiko Kabushiki Kaisha, Tokyo, Japan

[21] Appl. No.: 674,552

[22] Filed: Mar. 22, 1991

[30] Foreign Application Priority Data

Mar. 23, 1990 [JP] Japan .................................. 2-73610

[51] Int. Cl.⁵ ............................................. F16C 29/06
[52] U.S. Cl. ...................................................... 384/45
[58] Field of Search ............................ 384/45, 43, 44; 464/168

[56] References Cited

U.S. PATENT DOCUMENTS

| | | | |
|---|---|---|---|
| 4,806,022 | 2/1989 | Takahiro | 384/45 |
| 4,810,104 | 3/1989 | Matsuoka et al. | 384/45 |
| 4,869,600 | 9/1989 | Tonogai | 384/45 |
| 4,902,143 | 2/1990 | Morita | 384/45 |

FOREIGN PATENT DOCUMENTS 63-121817 8/1988 Japan .
63-171722 11/1988 Japan .
64-35220 3/1989 Japan .

Primary Examiner—Lenard A. Footland
Attorney, Agent, or Firm—Basile and Hanlon

[57] ABSTRACT

A linear guide apparatus includes an axially extending guide rail having ball rolling grooves formed in both side surfaces, and a slider movably straddling the guide rail and having ball rolling grooves formed in inner surfaces of both side walls. At least one of a clearance between an upper surface of the guide rail and a lower surface of the slider and a clearance between a side surface of the guide rail and an inner side surface of the slider is set smaller than the amount of displacement caused by an elastic deformation of contact portions at which the ball is in contact with the groove surfaces of the ball rolling grooves of the guide rail and the slider when a load equal to a fundamental static rating load is applied to the slider.

1 Claim, 2 Drawing Sheets

IMPACT RESISTIVE LINEAR GUIDE APPARATUS

BACKGROUND OF THE INVENTION

1. Field of the Invention

The present relates to a linear guide apparatus having a large impact resistance.

2. Description of the Art

A linear guide apparatus includes an axially extending guide rail having rolling body rolling grooves formed in side surfaces thereof and a slider movably fitted on the guide rail and having rolling body rolling grooves formed in inner surfaces of side walls thereof so that the rolling body rolling grooves of the slider respectively oppose the rolling body rolling grooves of the guide rail. The slider is smoothly movable in an axial direction through rolling of a plurality of rolling bodies rollably inserted between the opposed rolling body rolling grooves of the guide rail and the slider. Linear guide apparatus of this type are known in the art. For example, a linear guide apparatus including a guide rail having a square cross section, a slider having an inverted U-shaped cross section and straddling the guide rail, and rollers used as the rolling bodies is disclosed in Japanese Utility Model Laid-Open Publication No. 64-35220. A linear guide apparatus including a similar guide rail having a square cross section, a slider having an inverted U-shaped cross section and straddling the guide rail, and balls used as the rolling bodies is disclosed in Japanese Utility Model Laid-Open No. 63-171722. A linear guide apparatus including a guide rail having a square cross section and a slider fitted into an inside of the guide rail is disclosed in Japanese Utility Model Laid-Open No. 63-121817.

Such linear guide apparatuses are used in various applications as linear guide bearings and, for example, in the case of machine tools, as a guide and the like of a carriage of a lathe.

However, the linear guide apparatus is not necessarily loaded with a load of a certain limit. For example, when a carriage of the lathe collides with a chuck or the like, a large impulsive load will be generated. In the case where such an impulsive load is applied, since the total contact area of the contact portions between the rolling bodies and the groove surfaces of the rolling body rolling grooves of a linear guide apparatus is small, a the per unit contact area becomes very large. As a result, the contact portions at which the rolling body is in contact with the groove surfaces of the rolling body rolling grooves of the guide rail and the slider will be plastically deformed and there is a fear that harmful impressions will be made in the surface of the rolling body and in the groove surfaces.

In the prior art, when it is presumed that a harmful impulsive load will be applied to the linear guide apparatus, in order to bear such an abnormally large load, the number of sliders is increased, or a linear guide apparatus having a large load capacity is used as a countermeasure. Accordingly, a problem is involved in that such measures are uneconomical in view of the space required and the price of the large linear guide apparatus.

SUMMARY OF THE INVENTION

The present invention was made in view of the problem in the prior art and it is an object of the invention to provide a linear guide apparatus which is impact resistive so that even when an abnormally large impulsive load is applied thereto, there is no need to especially select a large-sized linear guide apparatus.

A linear guide apparatus of the present invention comprises an axially extending guide rail having rolling body rolling grooves respectively formed in side surfaces thereof, a slider movably fitted on the guide rail and having rolling body rolling grooves respectively formed in inner surfaces of side walls thereof so that the rolling body rolling grooves of the slider respectively oppose the rolling body rolling grooves of the guide rail, and a plurality of rolling bodies rollably inserted in the opposed rolling body rolling grooves of the guide rail and the slider. In this linear guide apparatus, at least one of the size of a clearance between an upper surface of the guide rail and a lower surface of the slider opposed to the upper surface and the size of a clearance between a side surface of the guide rail and an inner side surface of the slider is set smaller than the amount of displacement caused by an elastic deformation of the contact portions between the rolling body and the groove surfaces of the rolling body rolling grooves of the guide rail and the slider when a load equal to a fundamental static rating load is applied to the slider.

In the present invention, under a normal load condition in which no impulsive load is applied, opposed surfaces of the slider and the guide rail are not in contact with each other as a slight clearance is interposed therebetween so that the linear guide apparatus functions normally. However, when an impulsive load larger than the fundamental static rating load is loaded to the linear guide apparatus, the contact portions between the rolling body and the groove surfaces of the guide rail and the slider are deformed elastically to a great extent causing the clearance between the opposed surfaces of the slider and the guide rail, which is set to a predetermined small size, to be removed so that the opposed surfaces of the slider and the guide rail are brought into direct surface contact with each other. As a result, a load exceeding a certain limit never acts on the rolling body to cause a permanent strain. Thus, it is possible to prevent a phenomenon in which the rolling body and the groove surfaces of the rolling body rolling grooves are plastically deformed at the contact portions to produce harmful impressions therein.

BRIEF DESCRIPTION OF THE DRAWINGS

FIG. 1 is a front view partially cut away of a linear guide apparatus of one embodiment of the present invention;

FIG. 4 is a schematic, half, generally taken along line 4—4 in FIG. 3, cross sectional view for explaining the operation of the present invention.

DESCRIPTION OF THE PREFERRED EMBODIMENT

Figures 1, 4:
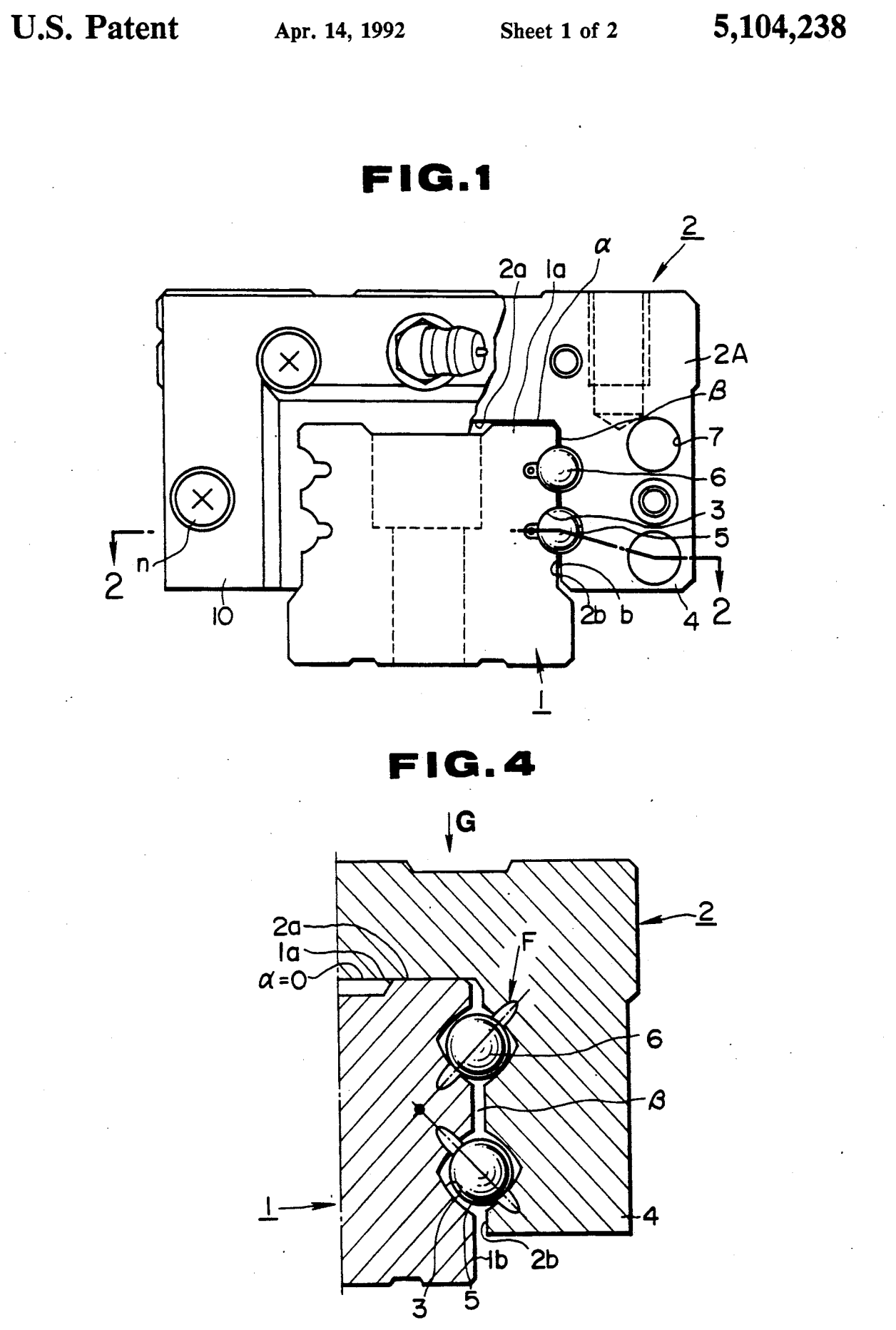
Figure 2:
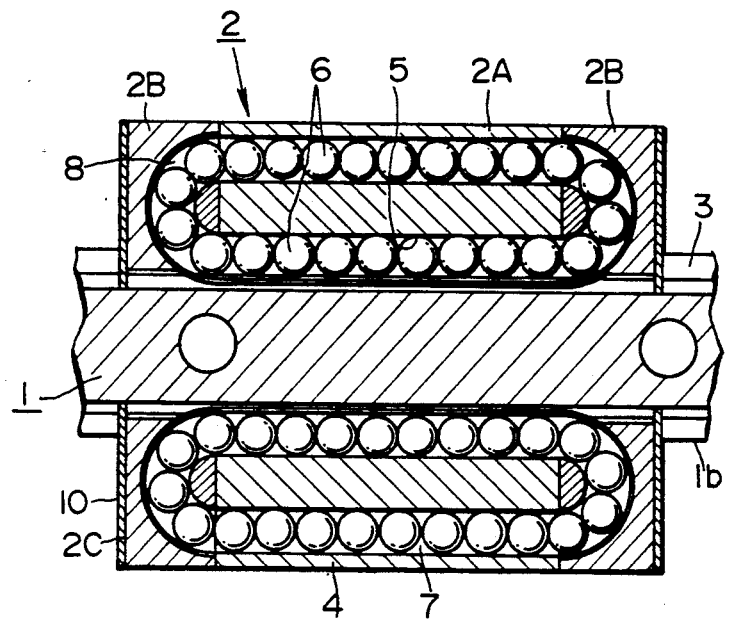
FIG. 2 is a cross sectional view taken generally along line 2—2 in FIG. 1.
Figure 3:
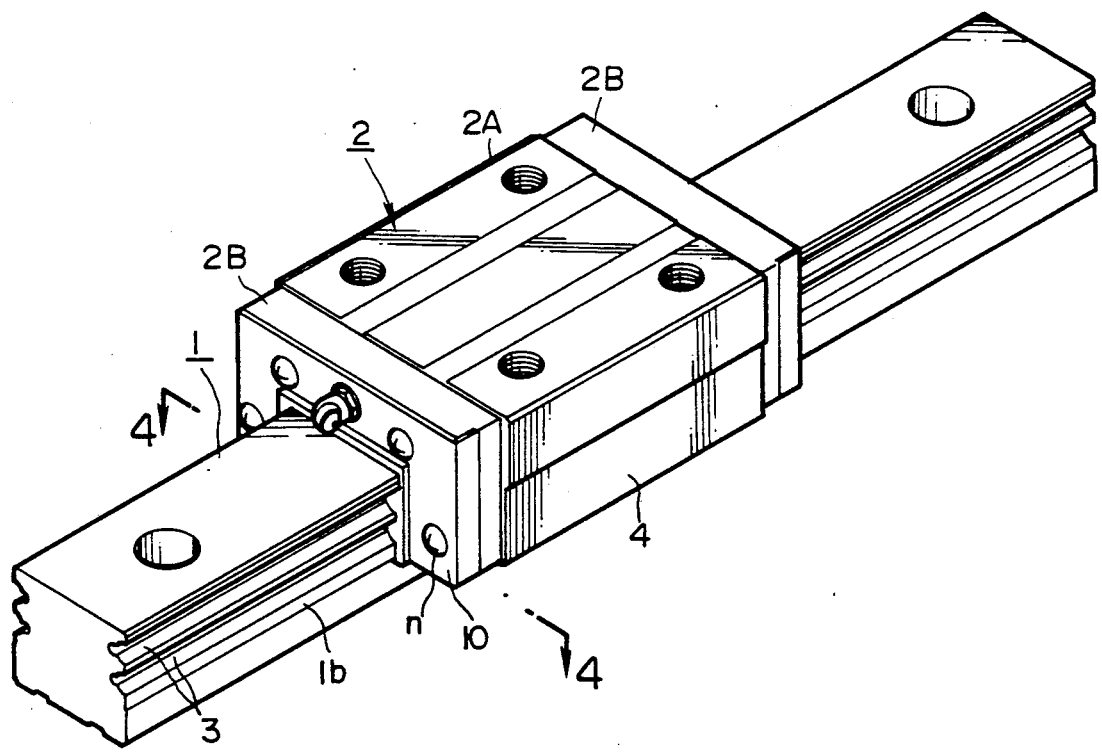
FIG. 3 is an overall perspective view.

FIGS. 1 to 4 show an embodiment of the present invention. A linear guide apparatus includes a guide rail extending lengthwise in an axial direction and a slider 2 movably straddling the guide rail 1 and having a substantially inverted U-shaped cross section. The guide rail 1 is, for example, fixed to a bed of a machine tool and the slider 2 is fixed to a table in use.

The guide rail has axially extending ball rolling grooves 3 formed in both side surfaces 1b. A slider main body 2A of the slider 2 has ball rolling grooves 5 formed in inner surfaces 2b of side walls 4 so that the ball rolling grooves 5 respectively oppose the ball rolling grooves 3 of the guide rail 1. A plurality of balls 6 are rollably loaded in the opposed ball rolling grooves 3 and 5 as rolling bodies. The slider 2 moves in the axial direction through the rolling of the balls 6. With the movement of the slider 2, the balls 6 interposed between the guide rail 1 and the slider 2 move while rolling to an end portion of the slider main body 2A of the slider 2. In order to continuously move the slider 2 in the axial direction, it is necessary to circulate the balls 6. Accordingly, through bores 7 which axially penetrate each of the side walls 4 of the slider main body 2A are formed as ball paths and, at the same time, end caps 2B of a substantially inverted U-shaped cross section are positioned and attached to axial opposite ends of the slider main body 2A. Each end cap 2B is formed with U-shaped curved paths 8 which brings the through bore 7 into communication with the ball rolling grooves 3 and 5 to thereby form an endless ball circulating path.

A clearance $\alpha$ is formed between an upper surface 1a of the guide rail 1 and an inner lower surface 2a of the slider 2 opposed to the upper surface 1a. At the same time, a clearance $\beta$ is formed between a side surface 1b of the guide rail 1 and an inner side surface 2b of the slider 2 opposed to the side surface 1b. The size of these clearances $\alpha$ and B is set to be smaller than the amount of displacement which is caused by elastic deformation of the rolling body 6 and the groove surfaces of the ball rolling grooves 3 and 5 due to a contact stress (maximum stress) acting on the contact portions between the rolling body 6 and the groove surfaces of the ball rolling grooves 3 and 5 when a load equal to a fundamental static rating load is applied to the linear guide apparatus. In this case, it is not necessarily required to set both of the clearances $\alpha$ and $\beta$ to the above-mentioned size; although at least one of the clearances $\alpha$ and $\beta$ may be set to the above-mentioned size. Here, the fundamental static-rating load is a static load in which, at a contact portion at which a maximum stress is applied to a bearing, the sum of the amount of permanent displacement of the rolling body and the amount of permanent displacement of the raceway surface is 0.0001 times the diameter of the rolling body. In this embodiment, the clearances $\alpha$ and $\beta$ are set to a size corresponding to a maximum elastic deformation just before a permanent deformation occurs at the above-mentioned contact portion.

A side seal 10 is attached to an outer end surface of the end cap 2B by small screws n in order to prevent the entry of foreign matters, such as dust, cuttings, chips, and the like, into the clearances $\alpha$ and $\beta$ from the outside.

Next, the operation of the present invention will be described.

Under a normal load condition in which no impulsive load is applied, the clearance $\alpha$ is interposed between the upper surface 1a of the guide rail 1 and the inner lower surface 2a of the slider 2 opposed to the upper surface 1a. Furthermore, the clearance $\beta$ is interposed between the side surface 1b of the guide rail 1 and the inner side surface 2b of the slider 2 opposed to the side surface 1b. That is, the facing or opposed surfaces of the guide rail 1 and the slider 2 are not in contact with each other and the linear guide apparatus functions normally.

It is assumed that a large load exceeding the fundamental static rating load is applied to the slider 2 of the linear guide apparatus in a direction shown by the arrow G in FIG. 4. Then, due to a contact stress F acting on the contact portions between the rolling body 6 and the groove surfaces of the rolling body rolling grooves 3 and 5, the rolling body 6 and the groove surfaces of the rolling body rolling grooves 3 and 5 tend to be plastically deformed through an elastic deformation. However, before reaching the plastic deformation, the clearance o becomes zero and the upper surface 1a of the guide rail 1 and the inner lower surface 2a of the slider 2 opposed to the upper surface 1a are brought into surface contact with each other. As a result, the contact stress F does not increase past a certain limit and the plastic deformation of the rolling body 6 and the groove surfaces of the rolling body rolling grooves 3 and 5 is prevented. Therefore, it is possible to prevent harmful impressions from being produced due to the plastic deformation of the rolling body 6 and the groove surfaces of the rolling body rolling grooves 3 and 5.

Similarly, when a lateral load exceeding the fundamental static rating load is applied, the clearance $\beta$ becomes zero and the production of harmful impressions in the rolling body 6 and in the groove surfaces of the rolling body rolling grooves 3 and 5 is also prevented.

In this embodiment, the impact resistance of a linear guide apparatus of the same size can be improved to a great extent. Accordingly, there is no need to take countermeasures as in the prior art, such as selecting a linear guide apparatus of a large size taking an impulsive load to be applied thereto into consideration, or to use a plurality of sliders. Therefore, a linear guide apparatus may be selected based on a normal load and, thus, a compact, inexpensive linear guide apparatus can be realized.

While the above embodiment is described as to the case of the linear guide apparatus in which the slider 2 having an inverted U-shaped cross section straddles a square cross section-type guide rail 1 and balls 6 are used as rolling bodies, the present invention is also applicable to a linear guide apparatus using rollers as the rolling bodies, or to a linear guide apparatus including a guide rail having an inverted U-shaped cross section and a slider fitted into the inside of the guide rail.

As described in the foregoing, in the linear guide apparatus in the present invention, at least one of the size of a clearance formed between an upper surface of the guide rail and in inner lower surface of the slider opposed to the upper surface, and the size of a clearance formed between a side surface of the guide rail and in inner side surface of the slider opposed to the side surface is set to be smaller than the amount of displacement which is cause by elastic deformation of the contact portions of the rolling body with respect to the groove surfaces of the ball rolling grooves when a load equal to a fundamental static normal load is applied to the linear guide apparatus. As a result, it is possible to provide a linear guide apparatus which is not damaged in the rolling body or in the raceway by a large impulsive load which is sometimes applied, even when the linear guide apparatus is of a size adapted to a normal load. Therefore, an advantage is provided in that the problem in the prior art relating to the space utilized and the high price can be solved.

What is claimed is:

1. In a linear guide apparatus having an axially extending guide rail with rolling body rolling grooves respectively formed in both side surfaces thereof, a slider movably fitted on the guide rail and having rolling body rolling grooves respectively formed in inner surfaces of both side walls thereof so that the rolling body rolling grooves of the slider respectively oppose the rolling body rolling grooves of the guide rail, and a plurality of rolling bodies rollably inserted in the opposed rolling body rolling grooves of the guide rail and the slider, the improvement comprising:

at least one of the size of a clearance between an upper surface of the guide rail and a lower surface of the slider opposed to the upper surface and the size of a clearance between a side surface of the guide rail and an inner side surface of the slider is set smaller than the amount of displacement caused by an elastic deformation of contact portions between the rolling body and the groove surfaces of the rolling body rolling grooves of the guide rail and the slider when a load equal to a fundamental static rating load is applied to the slider.

* * * * *